INVENTORS
HARVEY DAVID DECKER
JAMES EDWARD McGRAW
RICHARD R. BARBOUR

BY Glenn, Palmer, Lyne, Gibbs & Thompson
ATTORNEYS

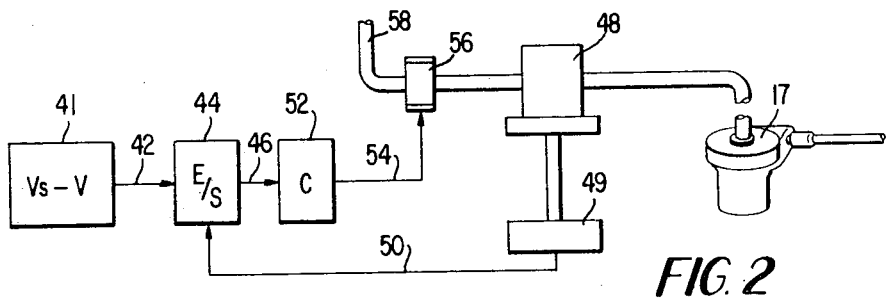
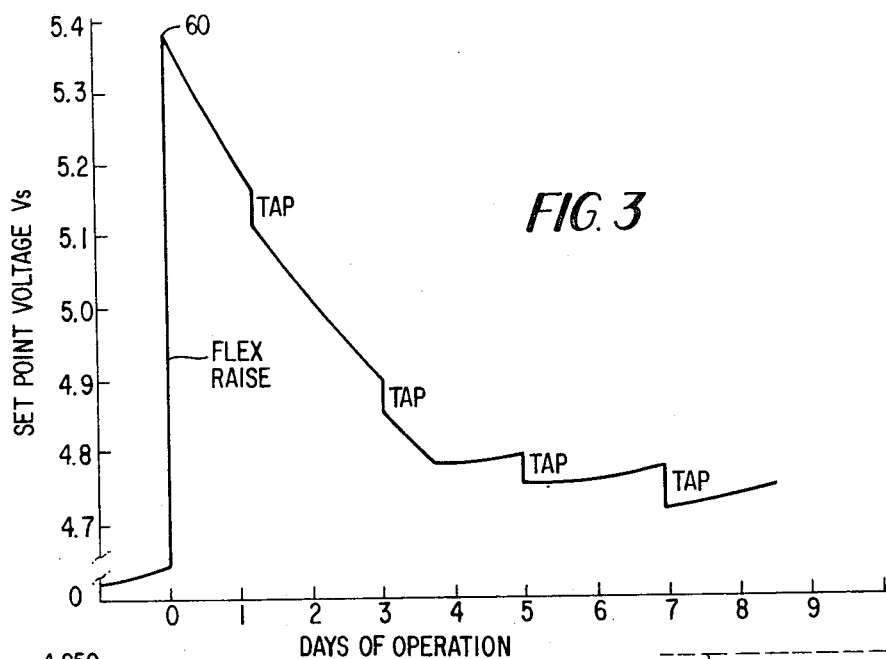
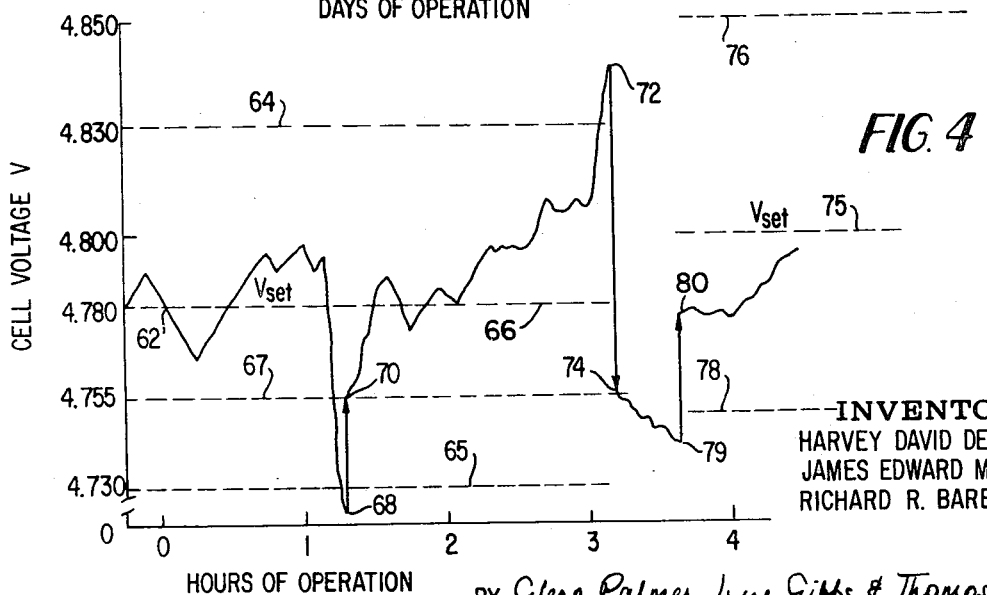

United States Patent Office 3,632,488
Patented Jan. 4, 1972

3,632,488
REDUCTION CELL CONTROL SYSTEM
Harvey David Decker and James Edward McGraw, Corpus Christi, and Richard R. Barbour, Richardson, Tex., assignors to Reynolds Metals Company, Richmond, Va.
Filed Jan. 23, 1969, Ser. No. 793,280
Int. Cl. C22d 3/12; B01k 3/00
U.S. Cl. 204—67
25 Claims

ABSTRACT OF THE DISCLOSURE

A method of controlling an aluminum reduction cell is disclosed, in which the heat flow coefficient for the bath is determined and used with a desired bath temperature to calculate the bath's heat loss energy. Calculations are also made of the cell's power requirements for purposes other than heating the bath such as the energy required to reduce the cell's alumina. The sum of the bath heat loss and other energy requirements is divided by the cell's base amperage to determine a set voltage and the cell's anode is adjusted to keep the cell voltage within predetermined limits of the set voltage.

---

Aluminum reduction cells can be effectively controlled by simulating the performance of such a cell by means of a mathematical model and then adjusting the cell's anode so as to operate the cell at a desired minimum bath temperature. One such method of aluminum reduction cell control is described and claimed in copending application Ser. No. 678,753, on a "Method of Controlling a Reduction Cell," now abandoned. That application was filed on Oct. 27, 1967 and is assigned to the same assignee as the instant invention.

In the copending application, a given cell is held as closely as practicable to the minimum bath temperature at which it can operate effectively for long periods of time. In doing this, however, it is customary to periodically measure the bath temperature so that the cell's anode can be adjusted to bring the measured bath temperature into agreement with the selected minimum bath temperature. But bath temperatures are difficult to measure and control. In other cases, an attempt is made to calculate the actual bath temperature. This is also difficult and time consuming. Hence, it is an object of this invention to permit control of a reduction cell by an objective method which substantially maintains a particular desired bath temperature, but which eliminates the previously required periodic measurement or calculation of the bath temperature.

Even in the case where a cell's instantaneous bath temperature is calculated, this is done by assuming a particular overall cell heat transfer coefficient, and this figure is based in large part upon measurements or estimates of the cell's ledge thickness; that is, the thickness of the frozen electrolyte which forms along the sides of the cell's lining. Hence, it is another object of this invention to provide a method of controlling a reduction cell which does not require the measurement or calculation of the cell's ledge thickness. As will be noted further shortly, this is most important in connection with Soderberg types of cells which are particularly sensitive to the thickness of this side wall crust or ledge.

Some methods of reduction cell control are directly dependent upon a determination of the cell's alumina content. This, however, is also a factor that is difficult to determine. It is therefore another object of this invention to provide a reduction cell control method that is not directly dependent upon a determination of the cell's bath alumina content.

Other objective methods of controlling reduction cells have also been suggested. These methods, however, have usually been directed toward the optimization of certain cell performance indicators which are only accurately determinable over long periods of time, and it is extremely difficult to make an hourly optimization of an indicator that can only be economically measured monthly, for example. It is another object of this invention, therefore, to describe an objective method of controlling a reduction cell's operation wherein frequent control steps nevertheless result in optimum long term cell performance as indicated, for example, by such basic long term performance criterion as the cell's profit.

In accordance with the principles of the invention, a temperature is selected at which it is desired to operate a given cell or line of cells. This temperature is determined, on the basis of prior experience with the particular potline, as being one at which the cells will operate well and have an acceptable ledge configuration. A prediction is then made of the amount of heat that each given cell's bath would lose if held at the selected temperature. Next, a modified form of heat balance is conducted to determine the amount of energy which the cell must receive in order to maintain the selected temperature; and finally, based on that energy determination, the cell's voltage is "set" so as to provide the required power to maintain the selected temperature.

The above summarized control method is based, at least in part, upon the observation that a reduction cell is "self-compensating." That is, if a cell is too cool, its ledge becomes thicker. This increases the cell's insulation and reduces its heat loss so that the cell's temperature increases. Similarly, if the cell becomes too hot, its ledge thickness decreases; its heat loss increases; and the bath temperature tends to be reduced. Consequently, in practicing this invention, it is not necessary to continually analyze the cell's bath alumina content; nor is it necessary to continually monitor either the cell's temperature or ledge thickness so long as the cell's voltage is set in accordance with the energy requirements determined from the heat balance which in turn is based on the selected temperature. Note, in this respect, that if the cell's actual bath temperature is used to determine the cell's "set voltage," the cell's heat input merely balances the cell's losses so as to maintain the cell at that actual temperature no matter how undesirable it might be.

The above comments are not to imply that measurements of actual cell temperature cannot or should not be made from time to time. In fact, it has been found desirable to do this as a check on both the effectiveness of the invention's operating method and the possibility of detecting certain equipment malfunctions. The point is, however, that the method of the invention permits a cell to be substantially continuously objectively controlled without requiring continuous bath alumina determinations or temperature measurements or cell ledge thickness calculations prior to each control operation.

A cell's line current is not a constant. Instead, it is merely the result of a "best effort" to maintain a current that is reasonably close to a posted average value. This, therefore, means that it is not desirable to have a constant set voltage. Consequently, it is another object of this invention to provide additional method steps for determining when to make changes in the cell's "set voltage."

The foregoing and other objects, features, and advantages of this invention will be apparent from the following more particular description of a preferred embodiment thereof in conjunction with the accompanying drawings wherein:

FIG. 2 is a schematic diagram of an electromechanical structure for altering the Soderberg cell's anode height;

FIG. 3 is a graph illustrating the changes in the FIG. 1 cell's voltage set point over a period of about 8 days;

FIG. 4 is a more detailed graph illustrating the cell's operation over a period of about 4 hours; and, FIG. 5 is a schematic diagram of apparatus for periodically determining the cell's desired set voltage.

Figure 1:
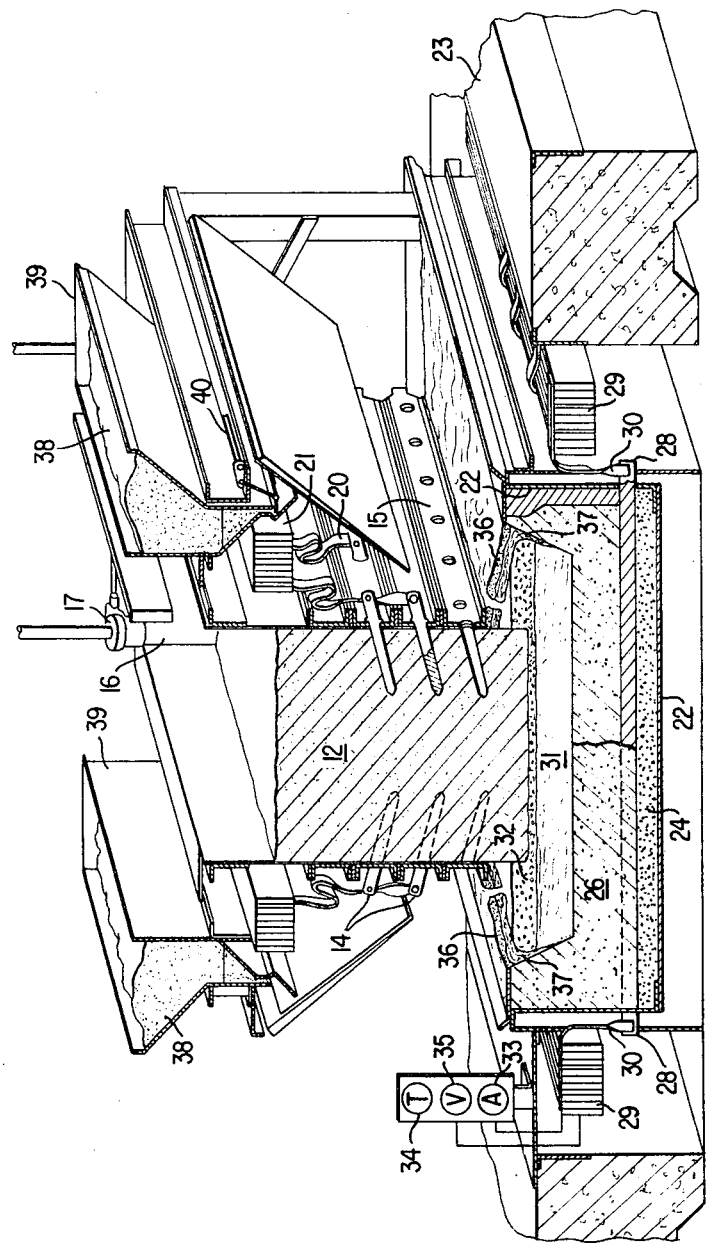
FIG. 1 is a schematic diagram of a self-baking Soderberg type of aluminum reduction cell.

The FIG. 1 schematic represents one important type of aluminum reduction cell. This type of cell is known in the industry as a self-baking Soderberg cell and is to be particularly distinguished from a "pre-bake" type of cell which is equally well known. The illustrated Soderberg cell's anode is comprised of a single large mass of carbon 12 that is baked in situ during the cell's operation. A pre-baked cell, on the other hand, is comprised of a plurality of previously baked carbon blocks. Although the instant invention is applicable to either type of cell, it will be primarily described in connection with a Soderberg cell. Certain references will be made, however, to application of the invention to pre-baked cells so that those skilled in the art will be able to apply the invention to whichever type of cell they prefer.

In the FIG. 1 schematic, the self-baking anode 12 is supported by anode pins 14 driven into the anode while it is still in the plastic or unbaked condition. The upper portion of the anode 12 is surrounded by channel members 15 which are connected to an anode adjusting assembly 16 moved up and down by a suitable jack or drive means such as 17. The anode pins are supported in the channels 15, which, in turn, are adjustably suspended from the superstructure of the cell by the anode adjusting assembly. Suitable flexible leads 20 form an electrical connection between the anode pins and an anode bus bar 21.

The pot portion of the cell is comprised of a steel shell 22 which is surrounded by a concrete island 23 and lined with both an alumina insulating layer 24 and a carbon cathode lining 26. Collector bars comprised of iron rods 28 are embedded in the lining 26 and connected to cathode bus bars 29 through flex leads 30. The lining 26 contains a pool of molten aluminum 31 and a bath 32 of alumina ($Al_2O_3$) dissolved in an electrolyte comprised of molten cryolite.

A suitable voltage forces the electrolyzing current to flow from the positive bus 21 through each anode flexible lead 20 to the anode pins 14 and the self-baking anode 12. Current then flows from the carbon anode through the bath 32, the molten aluminum 31 and the carbon lining 26, to the various current collecting iron rods 28, after which the current is delivered to a subsequent cell by means of the cathode bus bars 29. In this respect, an ammeter 33 measures the current through the cell; a thermometer 34 measures the ambient air temperature; and a volt meter 35 measures the voltage across the cell.

As the current flows through the bath, the dissolved alumina is electrolyzed into its constituents, with aluminum metal accumulating in the molten aluminum layer 31.

The molten electrolyte 32 is covered by a crust 36 which consists essentially of frozen cryolite constituents and additional alumina. The frozen crust extends downwardly along the sides of the carbonaceous lining 26 to form a ledge 37 whose thickness varies, among other things, in accordance with the temperature of the bath 32. Alumina ore 38 is suspended in bins 39 above the sides of the cell and dropped, under control of ore operators 40 onto the crust 36 after passing large sloping side doors affixed to the cell's superstructure. In this manner, the alumina is warmed by the cell until such time as it is fed into the bath as will now be described.

As alumina is consumed in the bath 32, more alumina may be fed into the bath by either breaking in a portion of the crust 36 or using a mechanical alumina feeder, not shown. As the electrolytic process progresses and the molten aluminum accumulates in the pool 31, the alumina's oxygen is combined with the anode's carbon to form carbon monoxide and carbon dioxide gases which escape through holes in the crust 36. Consequently, the accumulated aluminum must be periodically syphoned from the molten pool 31 and the carbon must be replaced. In self-baking Soderberg cells, fresh carbon paste is added to the top of the single anode. In pre-bake cells, entire new carbon blocks are periodically inserted.

As the electrolyzing current is forced through the cell, it must overcome the resistance of the molten cryolite-alumina bath 32. This is referred to as bath resistance and is represented by $R_b$. The cell's electrical cirucuit also includes an external resistance $R_{ext}$ and an over-voltage resistance $R_{ov}$. These terms are well understood in the art and will not be further defined herein. Suffice it to say, however, that the total resistance of a given cell may be defined as:

$$R_{cell} = R_{ext} + R_{ov} + R_b \qquad (1)$$

The current that is forced through the bath 32 is partially converted into heat at the rate of $I^2R_b$ where I is the current or line load that is measured by ammeter 33 as it passes through each of a given pot room's series connected reduction cells. A certain amount of this heat escapes from the cell. The remainder is used to maintain the cell's bath temperature $T_b$ within a desired temperature range. The heat which escapes does so through the insulation provided by the ledge 37, the carbonaceous conductive lining 26, the frozen crust 36, the carbon anode 12, and the insulating layer 24. This heat is transferred from the bath in accordance with a bath heat flow coefficient $U_p$. In this respect, $U_p$ as used herein has units of watts per degree centigrade and contains an "area constant" which will be discussed in more detail later. This is in contrast with the probably more conventional heat flow coefficients which have units of B.t.u.'s per hour, per square foot, per degree F.

As the current passes through the cell, a certain amount of heat is transferred back and forth between the various cell components. For example, some of the heat that is generated in the region of the cathode is transferred to the bath. Conversely, as the anode is consumed and therefore lowered into the bath, some of the bath's heat is transferred to the anode. This is particularly true at "flex raise"—a term used to describe the raising of the flexible leads 20 at a time when the lowermost set of anode pins 14 are removed from the anode 12 in FIG. 1 and a new set inserted into the top of the anode.

Having set forth the above background material, this invention's method of controlling an aluminum reduction cell's operation in accordance with an objective standard will now be described.

Basically, a cell temperature is selected at which a given pot will operate effectively. This information can either be obtained from past records of the cell, or through a series of tests. In this respect, there has been quite some controversy about optimum values of bath temperature. Some writers insist that relatively high bath temperatures yield best results. Others prefer relatively low bath temperatures; however, Reese in Industrial and Engineering Chemistry, Volume 47, No. 10, page 2069 suggests a bath temperature of 960° C.; and this temperature has been found to be satisfactory for use in connection with the Soderberg type of cell with which this embodiment of the invention is particularly concerned. But it should be noted that other selected temperatures may be equally satisfactory so long as they do not give rise to one of the many well known but undesirable cell conditions that are attributed to certain temperature extremes. In this respect except for occasional testing to determine the effectiveness of the invention's control method, this invention eliminates the requirement for frequent bath temperature measurement which, as noted above, is rather difficult—particularly with self-baking Soderberg cells which appear to be more prone to "hot spots" than are pre-bake cells.

Certain presently preferred equations for determining a cell's heat flow coefficient will be set forth in more detail shortly; but any convenient method of making such a determination can be employed. Whichever method is employed, once the bath heat flow coefficient $U_p$ is determined, it is then used in connection with the desired bath temperature and the ambient temperature to determine the amount of heat that the bath would lose if it were at the desired bath temperature. In this respect, use is made of the conventional formula:

$$Q_L = U_p(T_b - T_a) \quad (2)$$

where:

$Q_L$ is the bath's heat loss; $T_b$ is the desired Again, it should be noted that the cell's actual bath temperature is not used. Hence, in contrast with previously suggested reduction cell control methods, the method of the invention does not use a heat balance as such.

Next, a determination is made of the amount of heat which the cell requires in order to carry on the endothermic chemical reaction of converting the alumina to aluminum, CO, and $CO_2$. Again, although one suitable method for determining this quantity will be discussed in more detail later, any suitable formula can be used.

The total power requirement of the cell is the sum of the power required to maintain the cell's heat balance. That is, the power required to both reduce the alumina and maintain the cell's desired temperature while at the same time accounting for the $Q_L$ heat that is lost from the bath to the cell's surroundings. Mathematically, this can be expressed as:

$$P_n = P_d + P_r \quad (3)$$

where:

$P_n$ is the cell's net power requirement; $P_d$ is the power required to overcome $Q_L$ and other losses so as to maintain the cell's desired bath temperature; and $P_r$ is the power required to reduce the alumina. The voltage set point ($V_s$) is then calculated by dividing the net power requirement by the line current. In this regard:

$$V_s = P_n/I \quad (4)$$

Apparatus for generating signals representative of the above parameters will be described later. In any event, the voltage set point, $V_s$, is the actual value that is used to objectively control the cell. That is, the cell's anode is moved upwardly or downwardly so as to obtain that particular voltage set point or a suitable alternative voltage as will be described more fully in connection with FIG. 4. In this respect, it is not practical to control $V_s$ to an exact value. This is because a cell's voltage fluctuates continually and an exact control would result in continuous undesirable motion of the anode. Consequently, the cell's $V_s$ value is permitted to fluctuate within certain predetermined limits before the anode is adjusted. These limits vary from circumstance to circumstance, but should not be permitted to be so large that the above described heat balance is unduly upset. It is for this reason that it may be desirable to determine the cell's actual bath temperature from time to time. For example, if the cell's actual bath temperature varies appreciably from the desired bath temperature it can be taken as an indication that the $V_s$ limits are too broad.

Similarly, the set voltage $V_s$ itself can be redetermined when there is a significant change in one of the major parameters affecting the value of the cell's bath heat flow coefficient $U_p$. For example, as will be noted in connection with FIG. 3, a new $V_s$ is determined after each flex raise and each tap of aluminum from the pool 31. In this respect, it is also preferred to redetermine the set voltage after each four hours of cell operation even if there have been no significant changes in any of the major cell parameters affecting the bath heat flow coefficient.

The control method just described relies in large part upon the cell's self-compensation abilities. That is, by using the cell's desired bath temperature rather than its actual bath temperature the heat balance equations are unbalanced by an amount corresponding to the difference between the cell's actual and desired bath temperatures. For example, if the actual bath temperature is higher than the desired bath temperature, the cell's ledge thickness decreases. Hence, the cell's bath heat loss $Q_L$ increases so as to drop the cell's bath temperature toward that which is desired. If, on the other hand, the bath temperature drops too far, the ledge thickness begins to build up, decreasing the cell's heat loss $Q_L$, and increasing its temperature towards that which is desired. Consequently, neither the cell's ledge thickness nor its actual bath temperature are required inputs to the cell's heat balance control method. The above described method therefore, fulfills these objects of the invention.

In addition, the method of the invention permits relatively instantaneous objective control of the cell, while at the same time providing excellent results in terms of the cell's relatively long term performance indicators such as its power consumption per pound of aluminum and, ultimately, profit maximization.

In accordance with an extension of the invention, additional method steps are added so as to change the anode's position in accordance with the difference between the set voltage $V_s$ and the actual voltage V across the cell as measured by voltmeter 35 in FIG. 1. In this connection, suitable apparatus for performing these steps is illustrated in FIG. 2 wherein a conventional comparator or signal difference generator 41 delivers a difference or error signal E on line 42 whenever the difference between the set voltage and the actual voltage exceeds certain predetermined limits.

A divider circuit 44 functions to produce on line 46 a signal representing the error voltage E divided by the speed S with which an air motor 48 rotates jacks 17 which move the anode so as to cause the cell's actual voltage to change (as indicated by meter 35). To obtain an indication of the speed, air from the motor 48 is also delivered to a pulse generator 49 which generates a given number of pulses for each second of air motor operation. These pulses represent the speed of the air motor 48 in volts per second and are delivered to the divider circuit 44 on line 50. The output signal on line 46 is applied to converter 52 which produces an output signal on line 54 which has a duration proportional to the magnitude of the signal on line 46.

The signal on line 54 is delivered to a solenoid valve 56 which controls air from a line 58 to the air motor 48. In this respect, it should be noted that for purposes of simplicity, a single solenoid valve 56 and related control circuits have been shown. In an actual device, however, the air motor 48 is of a reversible type which is driven in one direction or the other by means of air from one or another set of related contol circuits and solenoid valves. Similarly, as will be more fully appreciated shortly, although anode changes are made when the actual cell voltage V deviates more than a given amount from the set voltage $V_s$, it is not necessary that the anode be adjusted so that the actual voltage is equal to the set voltage. In fact, as will be noted, it is preferred that the anode be adjusted to result in an actual cell voltage V that is slightly less than the set voltage $V_s$.

FIG. 3 is a graph illustrating the method of the invention as applied to a Soderberg cell over somewhat more than an eight day period. In that case, historical data showed 960° C. to be a temperautre at which the potroom's cells could be satisfactorily operated so as to maintain both good ledge thickness and production. A bath heat flow coefficient was then determined and the above described modified type of heat balance conducted to determine the amount of energy the cell had to receive to tend to hold that temperature. Next, based on that energy determination, a set voltage was determined that would supply the required energy under the circumstances. This setting of 5.380 volts is noted as point 60 in FIG. 3 and occurred at flex raise.

It can be seen from FIG. 3 that the thusly determined set voltage gradually decreased over the eight day period to a value of only about 4.735 volts just after a tapping of aluminum from the cell's pool 31 at about the end of the seventh day. This figure, however, gives only a broad view of the invention's method. FIG. 4, on the other hand, gives a detailed view of the cell's operation over a four hour period. It is in connection with that figure that the invention is most meaningful. In this respect, the four hour period of FIG. 4 represents the operation of the cell during the first four hours of FIG. 3's fifth day.

Somewhat prior to the four hour period illustrated in FIG. 4 the set voltage was determined to have been 4.780 volts as noted at point 62. At that time relatively arbitrary upper and lower limits were established of 4.830 volts (dashed line 64) and 4.730 volts (dashed line 65), respectively. So long as the actual cell voltage remained within these limts, no changes were made. If the cell voltage went outside of these limits, however, the anode position was changed to bring the cell voltage back within the upper and lower limits toward a value about midway between the set voltage $V_s$ (line 62 in FIG. 4) and the lower limit (line 65 in FIG. 4). The actual cell voltage was changed to about the intermediate value of 4.755 volts (dashed line 67) both because the actual cell voltage tends to rise as ore is depleted; and because the anode's carbon tends to burn off a bit faster than the aluminum pool builds up, whereupon a slight voltage rise is expected for this reason also. In this manner, the tendency for the actual cell voltage to increase is anticipated so as to result in somewhat fewer changes of the anode's position.

As operation of the cell proceeded, the cell voltage was monitored every three minutes (as was each other cell in the potline). After about an hour and 15 minutes the cell voltage dropped below the lower limit line 65 to point 68. Consequently, the anode was moved so that the cell voltage was corrected to point 70 in FIG. 3 which, as it happened, was found to be at intermediate line 67 (4.755 volts).

After somewhat more than three hours had elapsed, the voltage broke through the upper limit line 64 to point 72. Hence, the anode adjustment mechanism of FIG. 2 was again called on to change the cell voltage to point 74 at 4.760 volts.

Shortly thereafter, a new set voltage was calculated and found to be 4.800 volts as shown by dashed line 75. Hence, the upper and lower limits were also changed as represented by dashed lines 76 and 78 at 4.850 and 4.750 volts respectively. At that time, however, the actual cell voltage was at point 79 which was below the new lower limit line 78. Consequently, the signal difference generator produced an output on line 42 (FIG. 2) which resulted in the anode being adjusted upwardly until the actual cell voltage was at point 80, about midway between the new set voltage line 75 and the new lower limit 78.

The remainder of the period was completed without further adjustment of either the anode or the set voltage. Of note, however, is the fact that a test monitoring of the cell's temperature showed that it did not vary appreciably from 960° C. even though the cell's instantaneous temperature per se was not used in the cells' control. Moreover, from all indications, the cell's ledge thickness varied only in proportion to the temperature and remained at a desired thickness throughout the entire test; and still further, it should be noted that the anode changes themselves were made without regard to variations in the bath alumina content, which is a difficult parameter to measure and control. In fact, a satisfactory alumina feeding schedule has been found to be a "break" of about one-fourth of the cell's crust every four hours.

Figure 5:
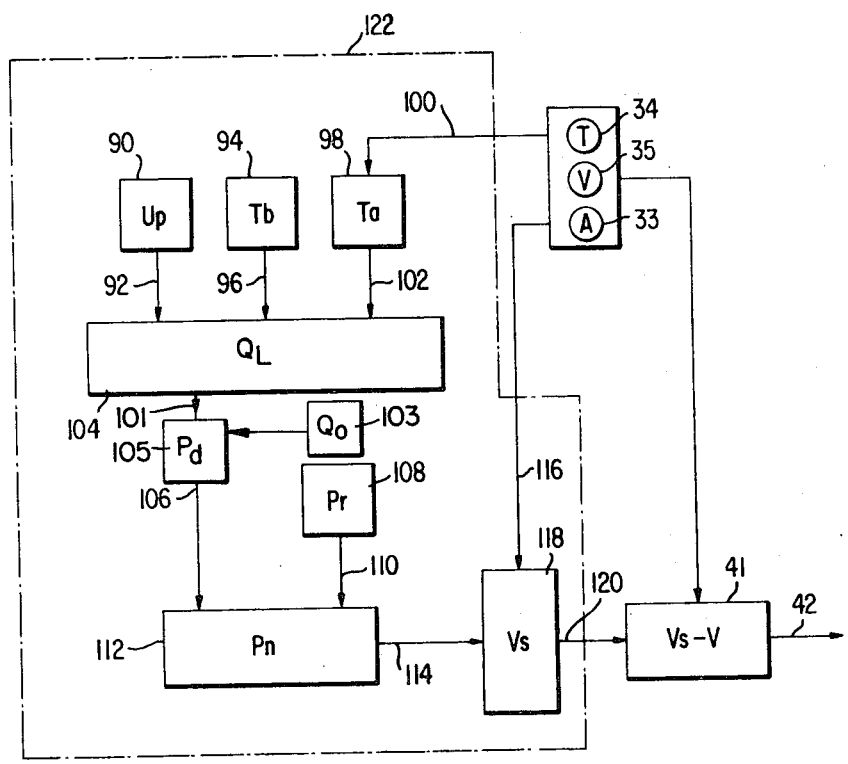

FIG. 5 schematically illustrates apparatus for periodically determining the cell's set voltage and generating a set voltage signal to be delivered to the signal difference generator 41 (see also FIG. 2) whose output on line 42 results in actual motion of the cell's anode so as to change the cell's actual voltage. In this regard, a digital signal generator 90 generates a signal on lead 92 representative of the bath's heat flow coefficient ($U_p$) which is determined by any one of several suitable equations such as those to be described more fully shortly. Similarly, the digital signal generator 94 generates a signal on lead 96 representative of the cell's desired bath temperature $T_b$; and a digital signal generator 98 is operative in response to a temperature signal on line 100 from the thermometer 34 to generate a signal on line 102 representative of the ambient air temperature $T_a$.

A digital signal generator 104 is operative in response to $U_p$, $T_b$, $T_a$ signals on lines 92, 96 and 102 respectively to generate a power requirement signal on line 101 representative of the amount of power that must be delivered to the cell to overcome the bath heat losses [$Q_L$—Equation 2].

Similarly, a digital signal generator 103 generates a $Q_o$ signal representative of other cell heat losses [see Equation 7]; and both the $Q_L$ and $Q_o$ signals are delivered to a digital signal generator 105 which generates a power requirement signal $P_d$ on line 106 representative of the amount of power that must be delivered to the cell to overcome its bath and other heat losses.

A digital signal generator 108 generates a signal on line 110 representative of the amount of power $P_r$ that must be delivered to the cell in order for its alumina to be reduced. This signal on line 110 and the heat loss power requirement signal ($P_d$) on line 106 are delivered to an adder circuit 112 which generates a signal on line 114 representative of the cell's net power requirement $P_n$ (Equation 3).

Ammeter 33 provides a signal on line 116 representative of the cell's line current. This line current signal and the net power requirement signal on line 114 are delivered to a divider circuit 118 which generates a signal representative of the cell's set voltage on line 120 (see Equation 4). This set voltage signal is delivered to the signal difference generator 41 which has previously been described in connection with the cell's anode adjustment mechanism.

The dashed line 122 in FIG. 5 is included to illustrate that the structures designated by reference numerals 90–120 can be included within a single structure which functions to generate the previously discussed set voltage signal $V_s$. In fact, in one preferred embodiment of the invention, a digital computer includes the various elements within the dashed line 122 along with the signal difference generator 41, the divider circuit 44 and the converter 52 of FIG. 2. Of course, an analog computer would also be suitable in this instance, as would a combination of electromechanical elements structured so as to co-act and function as described above.

Having broadly described the method and apparatus of the invention, certain suitable formulae will now be discussed. These formulae have been found to be suitable for use in the practice of the above described method for objectively controlling an aluminum reduction cell. Several of the variables which are about to be referred to have already been discussed above. The heat flow coefficient $U_p$ for example, is an essentially independent variable which increases with the cell's age $A_c$ and is also affected by changes in the thickness of the cell's aluminum pad 32 ($H_m$), and the depth $A_i$ to which the anode is immersed in the bath.

The heat flow co-efficient is also affected by the height ($H_{pb}$) of the anode paste, the height ($H_{ci}$) of the cathode insulation 26, and an alumina cover factor $A_{cf}$ which is representative of the thickness of the crust 36. Other special calibration factors $U_{sp}$ can also be used as required in each particular case. For example, in some cases it may be desirable to account for the local wind velocity.

In addition, it has also been found desirable to account for the heat transfer efficiencies of certain of the cell's major components. In this regard heat transfer efficiencies are defined in terms of the percentage of the heat generated in a particular region of the cell that is transferred to the bath. In Soderberg cells with which this invention was first practiced for example, the bath heat efficiency, $Z_b$, was found to be about 96%; the cathode heat efficiency $Z_c$ was found to be about 50% and, except for about the first 96 hours after a flex raise, the anode heat efficiency was found to be negligible.

That is, there was no tendency for heat to transfer between the anode and the bath. When the lowermost anode pins are removed at flex raise, however, there is usually a net heat exchange from the bath to the anode so that the anode's heat efficiency assumes a negative value. Consequently, it has been found practical to account for this in the first 96 hours of a cell's operation after flex raise.

An actual equation that has been found satisfactory for determining the heat flow co-efficient for Soderberg cells is:

$$U_p = -235.5 + 75.3(Z_a) + 516.1(Z_b) + 83.2(Z_c) \\ + 0.02677(A_c) + 6.167(H_m) + 6.633(A_i) + 0.0454(H_{pb}) \\ - 20.9(H_{ci}) - 10.5(A_{cf}) + U_{sp} \quad (5)$$

Once the cell's heat flow co-efficient is determined it is a relatively simple matter to use Equation 2 to calculate the amount of heat that a particular cell would lose if operated at its desired temperature $T_b$.

A cell's cathode resistance, $R_c$, can be obtained in any suitable manner such as by dividing its cathode voltage drop by the line current. The cell's anode resistance, $R_a$, can also be conventionally measured, but the following empirical equation has also been found to be satisfactory:

$$R_a = 6.469 - 0.01117(H_{pp}) - 0.06615(A_i) \\ + 0.09614(S_{ch}) - 0.4498 \log_e (T_{fr}+1) \\ + 0.00132(T_{fr}) \quad (6)$$

where the anode resistance $R_a$ is in micro-ohms; $H_{pp}$ is the anode paste height above the current carrying anode pins; $S_{ch}$ is the height of the anode channel members 16 in FIG. 1; $T_{fr}$ is the number of hours since the last flex raise; and $A_i$ is the anode immersion depth as previously noted.

It has been previously noted in Equation 3 that the cell's net power requirement includes the power $P_d$ required to maintain the cell's temperature at the desired level. The value of $P_d$ has been determined from the following equation:

$$P_d = \frac{Q_L + I^2[R_a(Z_b - Z_a - Z_{ex}) + R_c(Z_b - Z_c)]}{Z_b} \quad (7)$$

where: for convenience the terms other than $Q_L$ on the right hand side of the equation can be referred to as $Q_{other}$ ($Q_o$). That is, $P_d = Q_r + Q_o$. All of the remaining terms have been previously defined except for $Z_{ex}$ which is one of the additional compensating factors referred to previously. In this particular case, $Z_{ex}$ is the term used to compensate for the heat that the bath loses to the anode at a flex raise. In this respect, note that this factor in the above Equation 7 is a negative value. As noted above, however, for the first 96 hours or so after flex raise, there is an actual transfer of heat from the bath to the anode. Hence, there is a negative heat transfer to the bath so that additional heat must be added to the cell to maintain the cell's temperature at its desired level. Consequently, the negative heat transfer value and the negative sign in the equation combine to increase the required $P_d$ value.

The amount of power that is required to reduce the alumina is a function of the cell's current efficiency and the theoretical amount of power that is required to make a given amount of aluminum. In this respect, as noted at page 1776 of Perry, 1352.48 ampere-hours of current are theoretically required to make one pound of aluminum. Although having different units (watt-hours/hour) the above theoretical number can be converted to the actual reaction energy of a Soderberg cell by the equation:

$$P_r = I(2.178CE - 0.135) \quad (8)$$

where the current efficiency is represented by CE.

For convenience, the cell's reduction power requirement ($P_r$) can, if desired, be contemplated as being one of the cell's energy requirements for purposes other than heating the bath such as were referred to in connection with Equation 7.

A corresponding equation for a prebake cell which does not require the Soderberg cell's anode baking energy is:

$$P'_r = I(2.178CE - 0.096) \quad (8)'$$

As noted above, the set voltage is the ultimate objective control factor in the method of the invention; and this paarmeter is determined by dividing the net power by the line current. The line current, however, fluctuates from moment to moment. Conseqeuntly, a "base amperage" is used in all calculations for the determination of the set voltage, $V_s$. This concept is about to be described, but basically, the base amperage is determined by an exponential smoothing method which is essentially a method of calculating a moving average.

Particularly where computers are available, it has been found quite convenient to determine the cell's average amperage ($I_o$) for the preceding hour. The cell's instantaneous amperage, $I_i$, is also measured and a new average amperage, $I_n$, is calculated in accordance with a suitable equation such as:

$$I_n = I_o + 0.0148(I_i - I_o) \quad (9)$$

An arbitrary determination is then made of a suitable current differential at which the base amperage is to be changed in the above described calculations. In one pot line, for example, the base amperage was changed when the $I_n$ value differed from the old base amperage by more than about 750 amps. When this difference occurred, the base amperage was arbitrarily changed by one thousand amps in the direction of $I_n$.

While the invention has been particularly shown and described with reference to a preferred embodiment thereof, it will be understood by those skilled in the art that various changes in form and detail may be made therein without departing from the spirit and scope of the invention. For example, although the invention has been described in terms of sensing and calculating various parameters and variables, it will be apparent to those skilled in the art that analog and/or digital computers can be used to perform these functions with much more facility and rapidity.

Similarly, other equations can be used to approximate one or more of the equations set forth above. This is particularly so with respect to Equations 5–9. Apparently new equations can be obtained, for example, which may substantially duplicate the results described above over a particularly desired narrow range of variables. Other substantially equivalent equations may even omit reference to some of the parameters of the cell which are included above, but which a particular operator may desire to hold constant.

It is also expected that those skilled in the art should be able to modify the above equations as needed to account for particular conditions in particular plants. For example, the anode resistance, $R_a$, should be changed to account for changes in the type of carbon paste that is employed.

It should also be noted that although the invention has been described in terms of controlling a single cell, its principles are equally applicable to an entire line of cells. In fact, the principles of the invention were developed in connection with an entire pot line, but for purposes of simplicity have been described herein as though used in connection with only a single cell.

It might be desirable to account for such things as the accumulated error in a cell's prior set voltages; or perhaps alter the set voltage by a factor to account for the rate at which a cell's voltage error changes. If this were the case, the following formula would be representative of the type contemplated:

$$E_T = C_1 E_a + C_2 E_r + C_3 E_i \qquad (10)$$

where the C's are constants and the total error is comprised of the accumulated, rate, and instantaneous errors ($E_a$, $E_r$, and $E_i$, respectively).

And finally, although the graphs of FIGS. 3 and 4 have been used to describe the invention, they are only illustrative. In fact, although FIG. 4 only illustrates two anode changes in a four hour period, an average cell would probably have six such changes in a four hour period. Other cells, however, might not have their anodes changed for as long as 10 or more hours.

What is claimed is:

1. A method of operating an electrolytic cell for the production of aluminum, wherein alumina dissolved in a molten salt bath is reduced to aluminum metal by passing an electric current from an anode through said bath to a cathode comprising the steps of:
   generating an energy signal representing the energy required at a given cell amperage to substantially maintain the bath at a selected temperature;
   generating a set voltage signal representing a set voltage required to supply the energy requirement represented by said energy signal;
   generating a cell voltage signal representing the cell voltage; and,
   adjusting said anode to maintain said cell voltage signal within prescribed limits relative to said set voltage signal, whereby the temperature of said bath tends towards said selected bath temperature without requiring a measurement of the actual bath temperature.

2. The method of claim 1 including the step of:
   updating said energy signal to reflect an increase in the cell's energy requirement after a flex raise, said increase representing an amount corresponding to the amount of the bath's heat that is transferred to the anode.

3. The method of claim 1 wherein the generation of said energy signal includes the steps of:
   determining the cell's bath heat losses;
   determining the cell's power requirements for purposes other than heating the bath, including the amount of reduction energy to reduce said alumina; and,
   determining the cell's energy requirements to be the sum of the cell's:
     (i) power corresponding to said bath heat losses; and
     (ii) said other power requirements.

4. The method of claim 1 including the step of:
   determining a base amperage for said cell over a predetermined time period; and
   wherein said set voltage signal represents the quotient of said energy requirement divided by said base amperage.

5. The method of claim 4 wherein the generation of said energy signal includes the steps of:
   determining the cell's bath heat losses;
   determining the cell's power requirements for purposes other than heating the bath, including the amount of reduction energy to reduce said alumina; and,
   determining the cell's energy requirements to be the sum of the cell's:
     (i) power corresponding to said bath heat losses; and
     (ii) said other power requirements.

6. The method of claim 1 including the steps of:
   comparing said cell voltage signal with said set voltage signal to determine the difference therebetween;
   generating a voltage error signal corresponding to the value of greater than a predetermined difference between said actual voltage and said set voltage; and
   adjusting said anode in accordance with said voltage error signal.

7. The method of claim 6 wherein the generation of said energy signal includes the steps of:
   determining the cell's bath heat losses;
   determining the cell's power requirements for purposes other than heating the bath, including the amount of reduction energy to reduce said alumina; and,
   determining the cell's energy requirements to be the sum of the cell's:
     (i) power corresponding to said bath heat losses; and
     (ii) said other power requirements.

8. The method of claim 6 including the steps of:
   determining a base amperage for said cell over a predetermined time period; and
   wherein said set voltage signal represents the quotient of said energy requirement divided by said base amperage.

9. The method of claim 8 wherein the generation of said energy signal includes the steps of:
   determining the cell's bath heat losses;
   determining the cell's power requirements for purposes other than heating the bath, including the amount of reduction energy to reduce said alumina; and,
   determining the cell's energy requirements to be the sum of the cell's:
     (i) power corresponding to said bath heat losses; and
     (ii) said other power requirements.

10. The method of claim 6 wherein said anode is adjusted by an anode moving means which is operative in response to an anode control signal to adjust said anode and includes the steps of:
    generating an anode speed signal representing the speed with which said anode is adjusted by said anode moving means;
    dividing said voltage error signal by said anode speed signal and generating said anode control signal in correspondence with the quotient thereof; whereby said anode is moved for a time corresponding substantially to the difference between said cell voltage and said set voltage so that cell voltage is brought within prescribed limits relative to said set voltage.

11. The method of claim 10 wherein the generation of said energy signal includes the steps of:
    determining the cell's bath heat losses;
    determining the cell's power requirements for purposes other than heating the bath, including the amount of reduction energy to reduce said alumina; and,
    determining the cell's energy requirements to be the sum of the cell's:
      (i) power corresponding to said bath heat losses; and
      (ii) said other power requirements.

12. The method of claim 10 including the steps of:
    determining a base amperage for said cell over a predetermined time period; and
    wherein said set voltage signal represents the quotient of said energy requirement divided by said base amperage.

13. The method of claim 12 wherein the generation of said energy signal includes the steps of:
    determining the cell's bath heat losses;
    determining the cell's power requirements for purposes other than heating the bath, including the amount of reduction energy to reduce said alumina; and, determining the cell's energy requirements to be the sum of the cell's:
(i) power corresponding to said bath heat losses; and
(ii) said other power requirements.

14. The method of claim 13 including the step of:
updating said energy signal to reflect an increase in the cell's energy requirement after a flex raise, said increase representing an amount corresponding to the amount of the bath's heat that is transferred to the anode.

15. Apparatus for performing the method of claim 1 including:
means for generating a set voltage signal representative of said set voltage;
means for measuring the actual cell voltage and generating a cell voltage signal representative thereof;
means for generating a difference signal substantially representative of the difference between said set voltage and said cell voltage; and
means operative in response to said difference signal for adjusting said anode so that the voltage across said cell substantially corresponds to said set voltage.

16. The method of claim 3 wherein the determination of the energy corresponding to said bath heat losses includes the steps of:
determining a bath heat loss coefficient for the bath; and,
computing the cell's bath heat loss energy ($Q_L$) for operation of the cell at the selected bath temperature.

17. The method of claim 5 wherein the determination of the energy corresponding to said bath heat losses includes the steps of:
determining a bath heat loss coefficient for the bath; and,
computing the cell's bath heat loss energy ($Q_L$) for operation of the cell at the selected bath temperature.

18. The method of claim 7 wherein the determination of the energy corresponding to said bath heat losses includes the steps of:
determining a bath heat loss coefficient for the bath; and,
computing the cell's bath heat loss energy ($Q_L$) for operation of the cell at the selected bath temperature.

19. The method of claim 9 wherein the determination of the energy corresponding to said bath heat losses includes the steps of:
determining a bath heat loss coefficient for the bath; and,
computing the cell's bath heat loss energy ($Q_L$) for operation of the cell at the selected bath temperature.

20. The method of claim 11 wherein the determination of the energy corresponding to said bath heat losses includes the steps of:
determining a bath heat loss coefficient for the bath; and,
computing the cell's bath heat loss energy ($Q_L$) for operation of the cell at the selected bath temperature.

21. The method of claim 13 wherein the determination of the energy corresponding to said bath heat losses includes the steps of:
determining a bath heat loss coefficient for the bath; and,
computing the cell's bath heat loss energy ($Q_L$) for operation of the cell at the selected bath temperature.

22. The method of claim 3 including periodic redetermination of said bath heat losses to account for changes in cell parameters.

23. The method of claim 22 for use in the operation of a Soderberg-type cell wherein paste is periodically added to the anode thereof and said periodic redetermination of said bath heat losses accounts for the effects thereon of such paste addition.

24. A method of operating an electrolytic cell for the production of aluminum, wherein alumina dissolved in a molten salt bath is reduced to aluminum metal by passing an electric current from an anode through said bath to a cathode comprising the steps of:
determining the energy required for maintaining a selected bath temperature of the cell; and
adjusting the anode to supply the required energy, whereby the temperature of said bath tends toward said selected bath temperature without requiring a measurement of the actual bath temperature.

25. The method of claim 24 including the steps of:
generating a set voltage signal representing a set-voltage for supplying said required energy;
monitoring the actual voltage across said cell and generating a cell voltage signal representing said actual cell voltage;
comparing said cell voltage signal with said set voltage signal; and,
generating a voltage error signal corresponding to the value of greater than a predetermined difference between said cell voltage signal and said set voltage signal.

References Cited

UNITED STATES PATENTS

| | | | |
|---|---|---|---|
| 1,396,919 | 11/1921 | Brace | 204—69 |
| 2,564,837 | 8/1951 | Ferrand | 204—67 X |
| 3,294,656 | 12/1966 | Schmitt | 204—67 |
| 3,485,727 | 12/1969 | Uhrenholdt | 204—67 |

JOHN H. MACK, Primary Examiner

D. R. VALENTINE, Assistant Examiner

U.S. Cl. X.R.

204—225, 228